United States Patent
DeCardi et al.

[15] 3,680,885
[45] Aug. 1, 1972

[54] ANTI-HYDROPLANING DEVICE

[72] Inventors: Pedro DeCardi, Lakewood; Carl S. Taylor, Palos Verdes; Geoffrey L. Roberts, Laguna Hills, all of Calif.

[73] Assignee: McDonnell Douglas Corporation

[22] Filed: May 6, 1971

[21] Appl. No.: 140,859

[52] U.S. Cl. ............280/150 R, 244/103 R, 280/160
[51] Int. Cl. ..............................................B60r 27/00
[58] Field of Search .......280/150 R, 160; 244/103 R; 15/340

[56] References Cited

UNITED STATES PATENTS

| | | |
|---|---|---|
| 1,408,815 | 3/1922 | McKasty......................280/160 |
| 1,860,217 | 5/1932 | Azopardi......................280/160 |
| 2,474,284 | 6/1949 | Smith..........................280/160 |
| 2,677,516 | 5/1954 | Pilling.......................244/103 R |
| 3,182,934 | 5/1965 | Clark .........................244/103 R |
| 3,544,370 | 12/1970 | Wrede........................280/150 R |

Primary Examiner—Benjamin Hersh
Assistant Examiner—Robert R. Song
Attorney—Walter J. Jason, Donald L. Royer and Robert O. Richardson

[57] ABSTRACT

A water displacer such as a plow or scraper in front of the tires of a vehicle to remove water from a flooded surface and expose the tires to a mere wet track condition. An air jet optionally may be used between the positive displacer and the tires.

8 Claims, 7 Drawing Figures

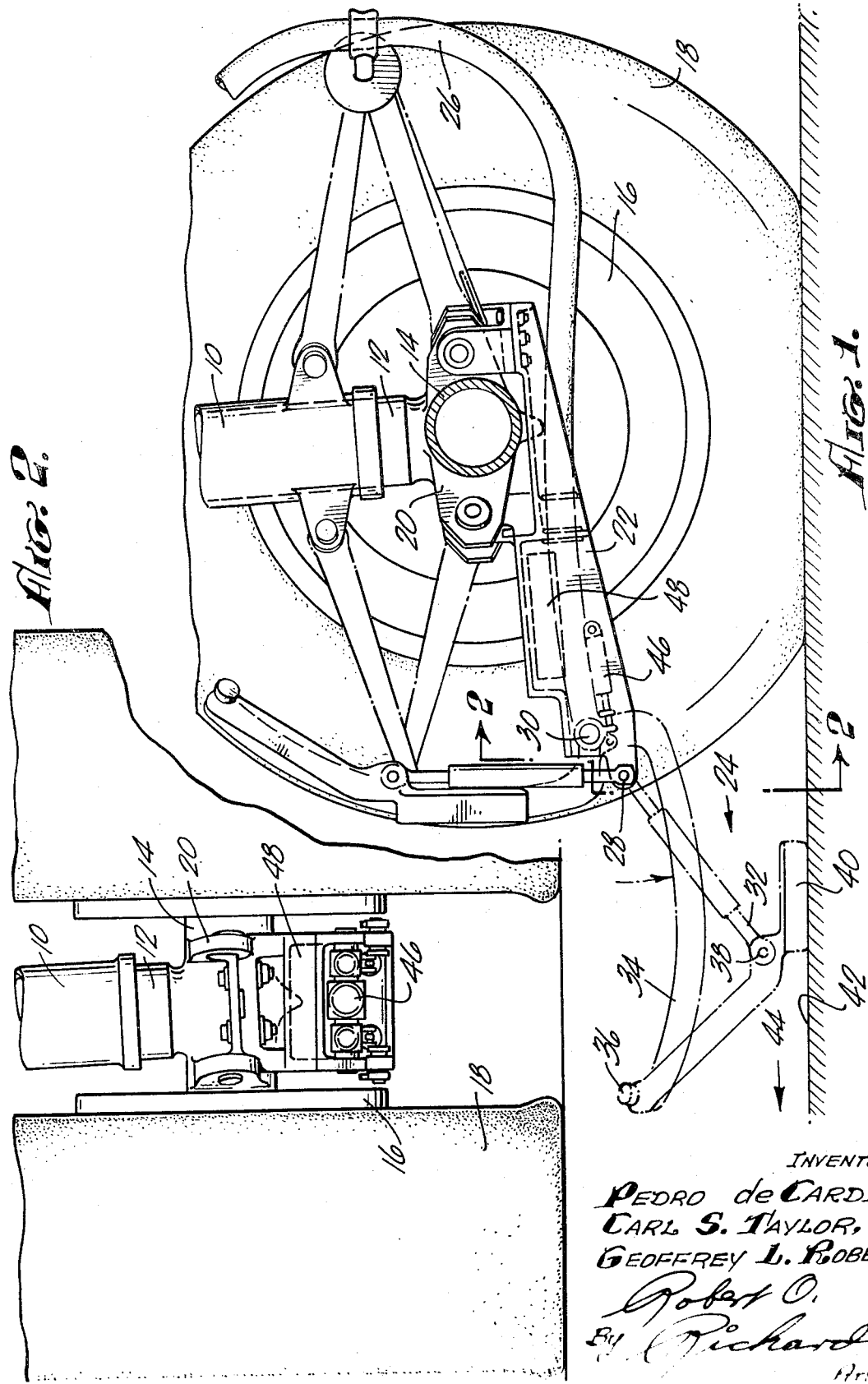

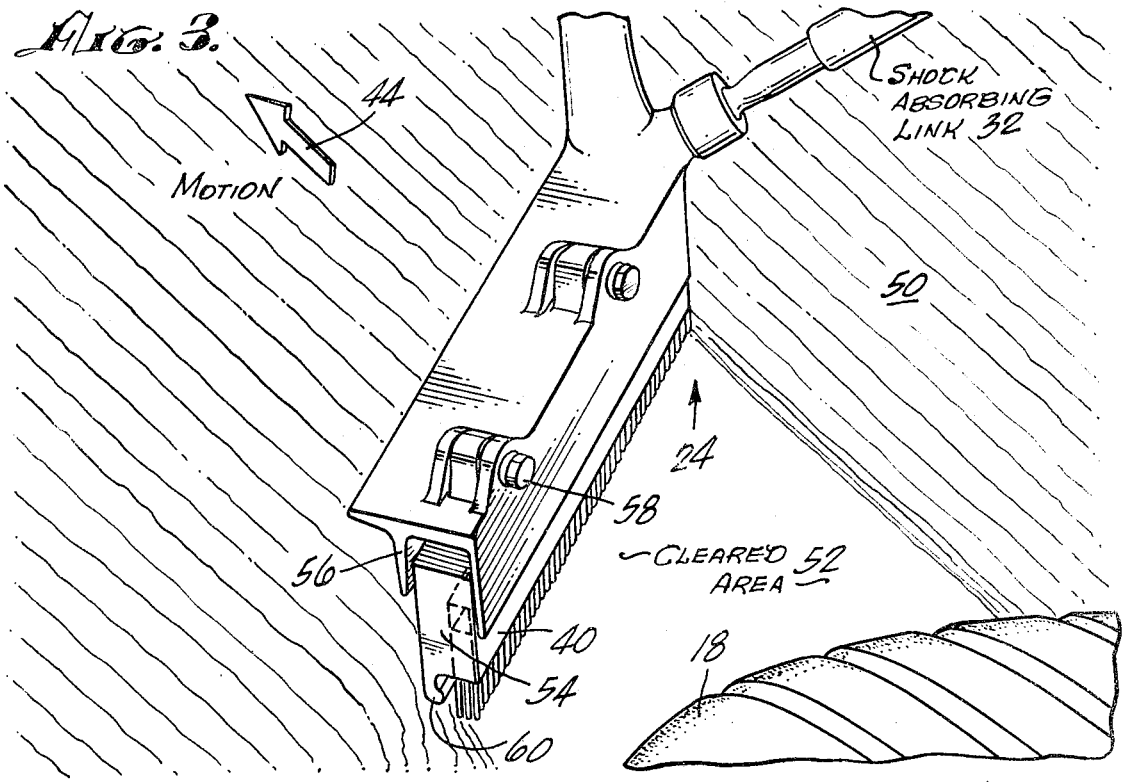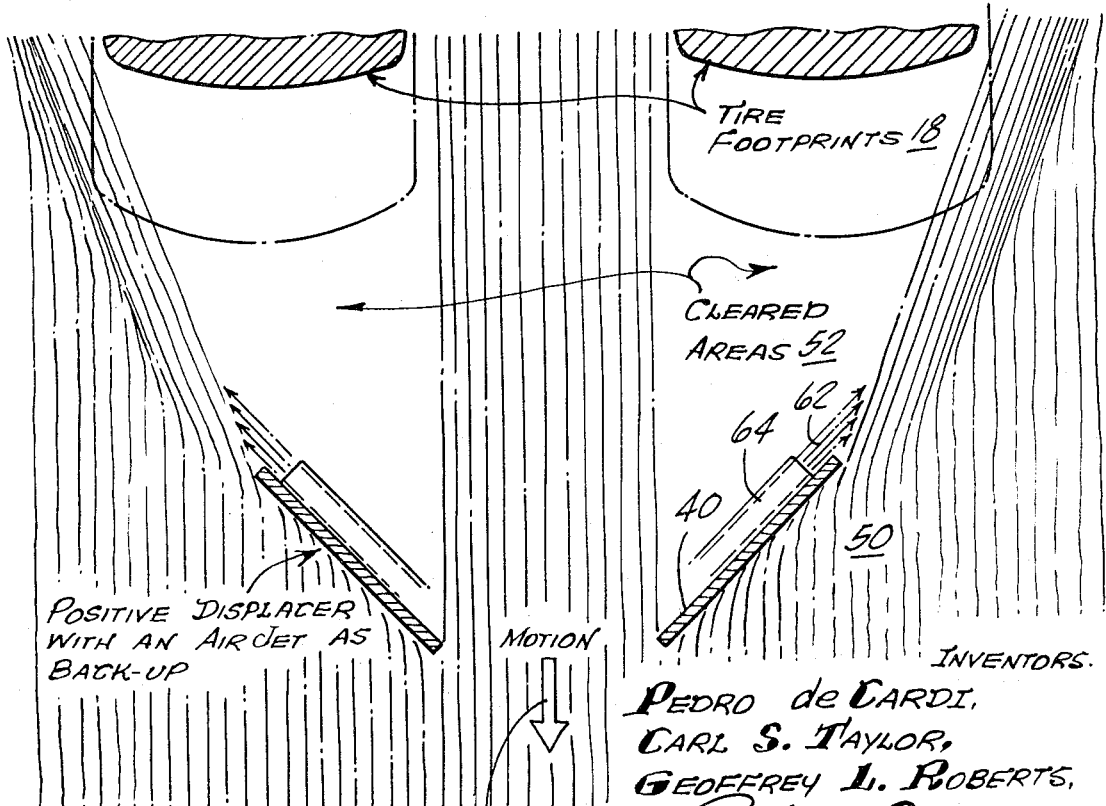

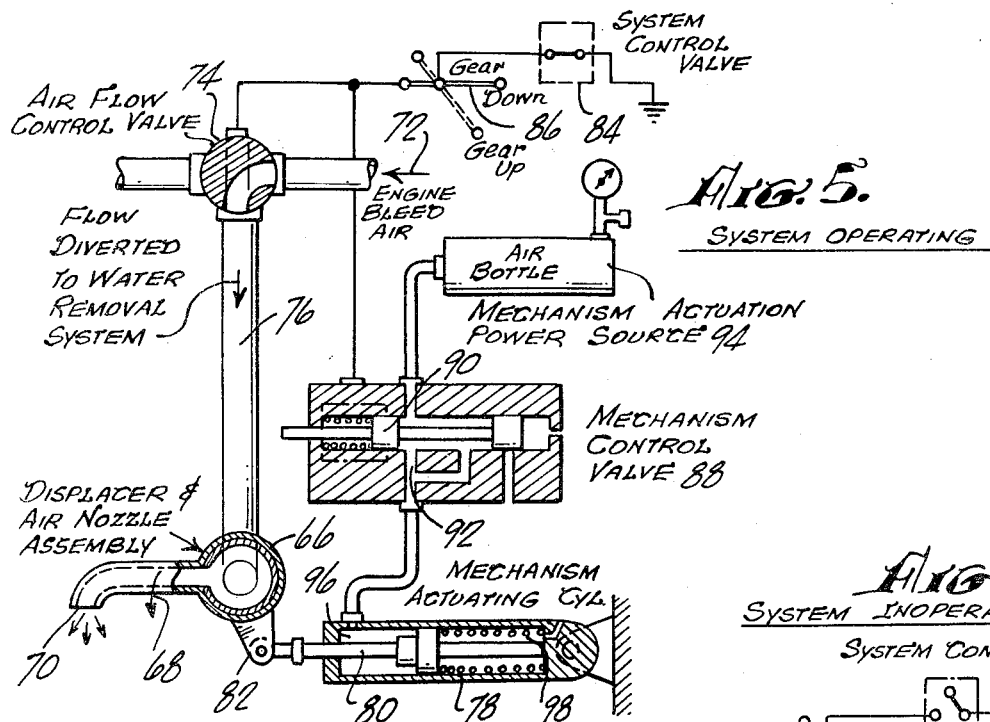
Fig. 5. SYSTEM OPERATING
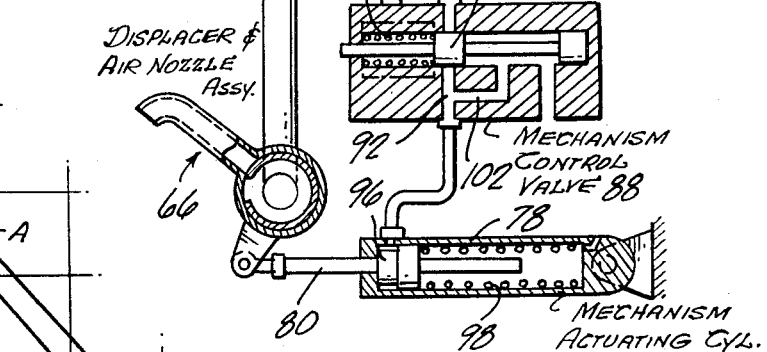
Fig. 6. SYSTEM INOPERATIVE
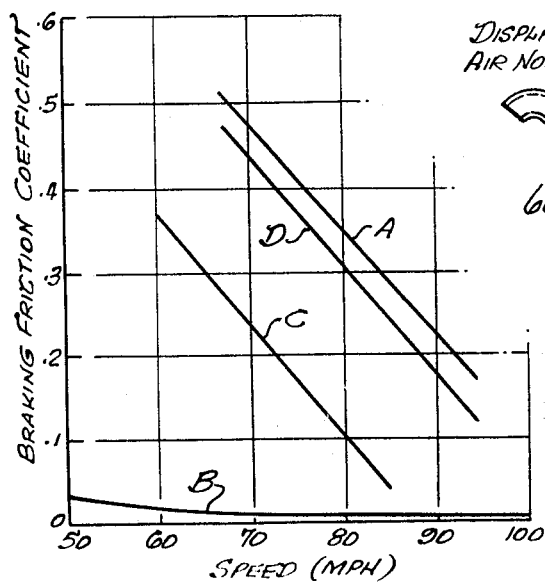
Fig. 7.
INVENTORS.
PEDRO de CARDI,
CARL S. TAYLOR,
GEOFFREY L. ROBERTS,
By Robert O. Richardson
ATTORNEY

ANTI-HYDROPLANING DEVICE

BACKGROUND OF THE INVENTION

The relatively high landing speeds of todays jet-powered transport aircraft brought the problems of increased stopping distances and the deterioration of directional control under flooded runway conditions. This is a direct result of tire hydroplaning. To improve this condition, pavement grooving has been proposed to improve traction. In addition, the use of air nozzles to blow away the water in front of the tires has been considered and experimented with. Although both of these systems have shown an improvement over no device at all, the results have been somewhat limited.

In a particular series of test run in one-eighth of an inch of water and without the help of any device or air nozzle, but over a grooved surface prepared according to NASA recommendations, the grooves yielded a coefficient of friction about twice the value of a track without any grooves. However, when the tire reached a velocity at which it started to hydroplane, the grooves had little effect. Thus, it was determined the the result of grooving on a track is a substantial gain in traction only when the velocity is under a hydroplaning speed. Grooving, therefore, does not prevent hydroplaning — it merely increases traction at speeds at which the tire is not hydroplaning.

An air nozzle in front of the tire has shown better results than a grooved track when the tire velocity is greater than its theoretical hydroplaning speed and in water depth up to one-fourth of an inch. An air jet improves braking appreciably if there is a sufficient available air flow and the water is not too deep. The airstream easily conforms to the irregularities of the pavement and cannot induce any drag forces on the nozzle itself. However, air is less effective in deeper water and at increased vehicle speeds. When the water depth is increased to on the order of one-half inch, for example, the nozzle must be relocated further in front of the tire to give the air more time to clear the larger amount of water. To place the air nozzle sufficiently far in front of the tire would require a heavier structure than is desired. Moreover, it has been found that the air pressure required when an air nozzle is used by itself to be from 130 percent to 185 percent over the pressure required in practicing the present invention wherein the apparatus includes a positive water displacer. In many cases there is not a sufficient air supply available.

SUMMARY OF PRESENT INVENTION

The apparatus of the present invention prevents tire hydroplaning on a flooded pavement by removing water from in front of the tires. It utilizes a positive water displacer such as a plow, brush or scraper to convert a flooded pavement in front of the tire to merely a wet pavement. When used with an air jet, the positive displacer portion of the apparatus of the present invention insures that the amount of water to be blown away remains at a constant predictable level regardless of the amount of water previously on the pavement.

The water removing mechanism consists of a series of ducts, swivel glands, a displacer or a combination displacer-nozzle for each row of tires, an actuating cylinder and a structural bracket for the mounting of the articulating portion of the system. When an air jet is used, this system utilizes engine bleed air for the clearing of the water immediately in front of the tires. The displacer is mounted with a linkage that self-generates a down load. The deeper the water the greater the drag of the displacer. Puddles cause a down load which is released when the displacer passes over bare spots. This is due to the hydrodynamic drag of the displacer and the moment arm of the support linkage. The clearing of water is aided by use of the inertia of the aircraft itself while wedging through the water. This allows the air, when used, to clear the remaining water immediately in front of the tires, allowing the traction of the tire as if the pavement were merely wet with no puddles, regardless of the depth of the water on the runway at the time of takeoff or landing. This results in a normal stopping distance and prevents loss of directional control, both during landing and takeoff. By reducing the amount of water contacting the tires, it reduces the mass of spray to a safe level, both during landing and takeoff. It also may be adapted to motor vehicles to aid them in reducing the stopping distances required on flooded roadways and to prevent loss of control due to tire hydroplaning.

The structure incorporating the present invention is a bolt-on unit that can be added to existing aircraft without modification. It thus can be used in seasonal weather or in areas where flooded runways are a problem and then removed to save weight when not needed.

This anti-hydroplaning device is most effective within the first few seconds after touchdown and until aircraft speed has been reduced to below that at which hydroplaning will occur. Thus, appropriate switches provide for its operation after full weight of the aircraft is on the landing gear and the brakes have been applied.

BRIEF DESCRIPTION OF THE DRAWINGS

FIG. 1 is a side elevational view showing the mechanism in solid line in stowed position and in dashed line for deployed position operation;

FIG. 2 is a view taken along the line 2—2 in FIG. 1;

FIG. 3 is a perspective view of a displacer in operation;

FIG. 4 is a plan view showing the operation of a pair of displacer units for dual wheels;

FIG. 5 is a schematic illustration of the displacer and air system in operational position;

FIG. 6 is a schematic illustration of the displacer and air system in its stowed position; and FIG. 7 is a graphic illustration comparing the effects of braking at various speeds under different surface conditions.

DETAILED DESCRIPTION OF ILLUSTRATIVE EMBODIMENTS

Referring now to FIGS. 1 and 2, there is shown a landing gear cylinder 10 having inserted at the lower end thereof a landing gear piston 12 on which is affixed an axle 14. Landing gear wheel 16 and tire 18 are rotatably mounted on axle 14. A structural bracket 20 is affixed to the landing gear piston 12 for retaining a support housing 22 thereto. This housing preferably is of an aluminum alloy casting and serves to support the displacer deice 24, to suppress ensuing water spray by its slanted cover, and to route compressed air to the displacer. An engine bleed air line 26 supplies air to the housing 22. Attached to the front of the housing 22 at spaced pivot points 28, 30 a spring link 32 and support arm 34 are pivotally mounted. The outer ends of the support arm 34 and the spring link 32 are pivotally mounted at spaced pivots 36, 38 to the displacer device 24 so that the end of support arm is forwardly of brush 40 which drags behind and is urged downwardly by spring link 32. This structure is adapted to be moved between its stowed position shown in solid line and its deployed position shown in dashed line wherein the displacer brush 40 moves over surface 42 in the direction of arrow 44 when in operation. An actuation cylinder 46 is connected to the support arm 34 to lower the displacer device for use. Springs, not shown, maintain the displacer in stowed position except for its brief period of use after touchdown. Principle use of this device is within the first 6 seconds after touchdown to clear a path through water until the aircraft speed has been reduced to below that at which hydroplaning will occur. Thus, if the actuation cylinder 46 is pneumatically powered, only a small amount of air under pressure is needed. Such an air source might be a small accumulator bottle 48, for example, stored in support housing 22. Actuation of cylinder 46 may be triggered on touchdown by an appropriate sensor (not shown) detecting full weight of the aircraft on landing gear piston 12 and/or application of brakes. The response time of the displacer device in moving from stowed position to operational position may be less than 1 second.

That portion 40 of the displacer 24 contacting the ground 42 may be a brush, resilient or stiff blade, or scraper that will move water out of the path of the oncoming tire 18. Its distance in front of the tire is such that a damp but not flooded path is exposed to the tire. The linkage is such that water creates a hydrodynamic drag on the brush which actually acts as a braking device to slow up the forward motion of the aircraft. The linkage is also such that a wet spot tends to force the brush 40 rearwardly against spring cylinder 32. Because pivot point 28 is above pivot point 38, cylinder 32 tends to rotate counterclockwise and force brush 40 more tightly against surface 42. This keeps brush 40 from hydroplaning. This rearward drag on brush 40 is not present when brush 40 passes over a dry spot, so the downward force is also relaxed. This saves wear on the brush.

Reference is now made to FIG. 3 which shows in perspective how the positive displacer device 24 operates. The aircraft moves in the direction of the arrow 44 in a wet surface environment illustrated by lines 50. The positive displacer device 24 is mounted in front of wheel 18 in such manner that the brush 40 sweeps the water aside, leaving a cleared area 52. The brush holder 54 fits within a channel section 56 of the displacer device 24 and is retained in position by means of bolts 58. The lower edge 60 of the brush holder 54 is curved inwardly so that the brush might ride over bumps or irregularities in the surface. This lower edge also displaces flood water. The shock absorbing link 32 is pivotally connected to the device 24 to absorb shock and to provide a down load to prevent hydroplaning of the brush. The hydrodynamic drag of the water on the brush additionally provides some braking effect.

Most aircraft landing gear uses dual rows of wheels and tires. Example of such tire prints is shown in FIG. 4 by tires 18. The brushes, scrapers or blades which serve as positive displacers 40 are shown in a slanted position to the direction of motion 44 for diverting water 50 from the now-cleared area 52 in front of the tires 18. As an option, air jets 62 are also directed outwardly from jet nozzles 64 mounted behind the positive displacers 40.

In FIG. 5 there is shown a schematic illustration of the system in operation. Although shown with the use of air jets, the displacer may function without them. The displacer and air nozzle assembly 66 is shown in its down or operating position shown by arrow 68 at which time its outlet 70 is connected to an engine bleed air source designated by arrow 72. An air flow control valve 74 has been turned to divert the flow from the engine to the water removal system through an air conduit 76. A mechanism actuating cylinder 78 has a piston 80 connected to bracket 82 on the nozzle assembly 66 and, when the piston 80 is extended to the right as shown, the nozzle is in its down position as shown. The actuation of the air flow control valve 74 and the mechanism actuating cylinder 78 is controlled by the on-position of the system control valve 84 and a gear-down switch 86 which completes an appropriate electrical circuit when the landing gear is in the down position. Valve 84 may be actuated by a sensor (not shown) that determines when the aircraft has landed and/or brakes are applied. This electrical circuit also controls a mechanism control valve 88 by moving an appropriate air blockage piston 90 from air path 92 to permit a connection between air bottle 94 (which is the mechanism actuation power source) to the inner chamber 96 of the mechanism actuating cylinder 78. It is this compressed air that causes piston 80 to be moved to the right against the action of spring 98.

It will be seen with reference to FIG. 6 that when air from the air bottle 94 is no longer available in the chamber 96 of the mechanism actuating cylinder 78 the spring 98 moves the piston 80 to the left and the nozzle and air displacer assembly 66 moves upwardly. This is accomplished when the gear-down switch 86 has been moved to its gear-up position as shown. This breaks the circuit which in turn permits spring 100 in the mechanism control valve 88 to move piston 90 into the air path 92 from the air bottle 94 to the chamber 96. The air within chamber 96 then escapes by passing out through a bypass vent 102 in the mechanism control valve 88. Appropriate electrical apparatus is also controlled by the gear-up, gear-down switch 86 to turn off the air flow control valve 74 to make available the air from the engine bleed air source 72 to other systems, as shown by the passage of air along the line designated by arrow 104.

An interesting comparison is made in the graphic illustration in FIG. 7 of the effectiveness of different water removal methods on a skidding tire on a rough pavement. Line A represents a damp surface condition in which no water removal device is used or needed. Its braking friction coefficient remains high even at the higher speeds. Line B represents a ⅛ inch flooded condition with no water removal device used. The braking friction coefficient is low and hydroplaning occurs. The skidding tire exerts practically no braking force on the pavement. Line C represents a ¼ inch flooded condition in which an 80 p.s.i. air jet only is used. This is a big improvement even when the flooded condition is worsened. Line D, however, nearly approaches the ideal condition of line A. Line D represents the condition of a ½ inch flooded surface with a plow and only a 45 p.s.i. air jet clearing a path in front of the tire. Obviously a more effective performance with a smaller air supply in worse flooded conditions is attributed to the use of the positive displacer device.

Having described an illustrative embodiment of the present invention, it is to be understood that other embodiments will occur to those skilled in the art and that these modifications are to be construed as part of the present invention.

We claim:

1. An anti-hydroplaning device comprising:
   a mounting bracket for attachment to a movable vehicle,
   an arm pivotally mounted to said bracket and extending forwardly in front of a wheel of said vehicle,
   a displacer device pivotally connected to the forward end of said arm and extending downwardly and rearwardly therefrom in use position,
   a surface contacting element on said device,
   a spring link pivotally interconnecting said bracket and the lower rearward portion of said displacer device to urge said element into surface contact,
   means continually urging said arm upwardly into stored position, and
   means for selectively rotating said arm downwardly to use position.

2. An anti-hydroplaning device as in claim 1, wherein said arm downward rotating means is an air cylinder actuated by selected conditions.

3. An anti-hydroplaning device as in claim 2, wherein said air cylinder is actuated upon application of vehicle brakes.

4. An anti-hydroplaning device as in claim 2 wherein said air cylinder is actuated be weight of said vehicle upon said wheels.

5. An anti-hydroplaning device as in claim 1 wherein an air jet is provided to spray air on the surface behind said element.

6. An anti-hydroplaning device as in claim 5 wherein said arm and said displacer device has an air path therein for transmission of air from an air source to the ground surface in front of said wheel.

7. An anti-hydroplaning device as in claim 5 wherein air for said air jet is shut off when said arm is raised to stored position.

8. An anti-hydroplaning device as in claim 1 wherein water on said surface causes a hydrodynamic rearward drag on said element, said spring link and said drag causing a downward movement on said element to prevent hydroplaning thereof.

* * * * *